United States Patent [19]

Holtzman et al.

[11] 3,724,057
[45] Apr. 3, 1973

[54] METHOD OF MAKING VALANCES FOR LUGGAGE

[75] Inventors: Samuel J. Holtzman, Baltimore, Md.; Peter A. Cosme, Lockport, Ill.

[73] Assignee: Roper Corporation, Kankakee, Ill.

[22] Filed: Oct. 6, 1971

[21] Appl. No.: 187,088

[52] U.S. Cl. ...................29/416, 29/425, 190/28, 190/41 R
[51] Int. Cl. .............................................B23p 17/00
[58] Field of Search.29/416, 412, 414, 425, DIG. 47; 190/28, 41 R; 113/116 R, 116 I, 116 Z, 116 BB, 1

[56] References Cited

UNITED STATES PATENTS

| | | | |
|---|---|---|---|
| 1,552,748 | 9/1925 | Kopplinger | 29/416 |
| 3,135,366 | 6/1964 | Holtzman | 190/41 |
| 3,165,827 | 1/1965 | Stollman | 190/28 X |
| 3,292,252 | 12/1966 | Reading | 29/416 |
| 3,332,136 | 7/1967 | Bish et al. | 29/416 X |

*Primary Examiner*—Charles W. Lanham
*Assistant Examiner*—V. A. Dipalma
*Attorney*—Wolfe, Hubbard, Leydig, Voit & Osann

[57] ABSTRACT

The method of making extruded metal valances for luggage which includes steps of extruding male and female valance cross sections integrally edge-to-edge, welding the extrusion into a closed loop, expanding the loop to the desired size and shape, with accompanying bending, severing the extrusion at the joined lateral edges to form mating male and female valances, and then reversing the order thereof for assembling in mating relation. The procedure includes heat treating and anodizing as a preliminary step before the extrusion is cut and formed and the piercing of any necessary holes or lugs while the extrusion is still in a single, easily handled piece and prior to severence.

3 Claims, 8 Drawing Figures

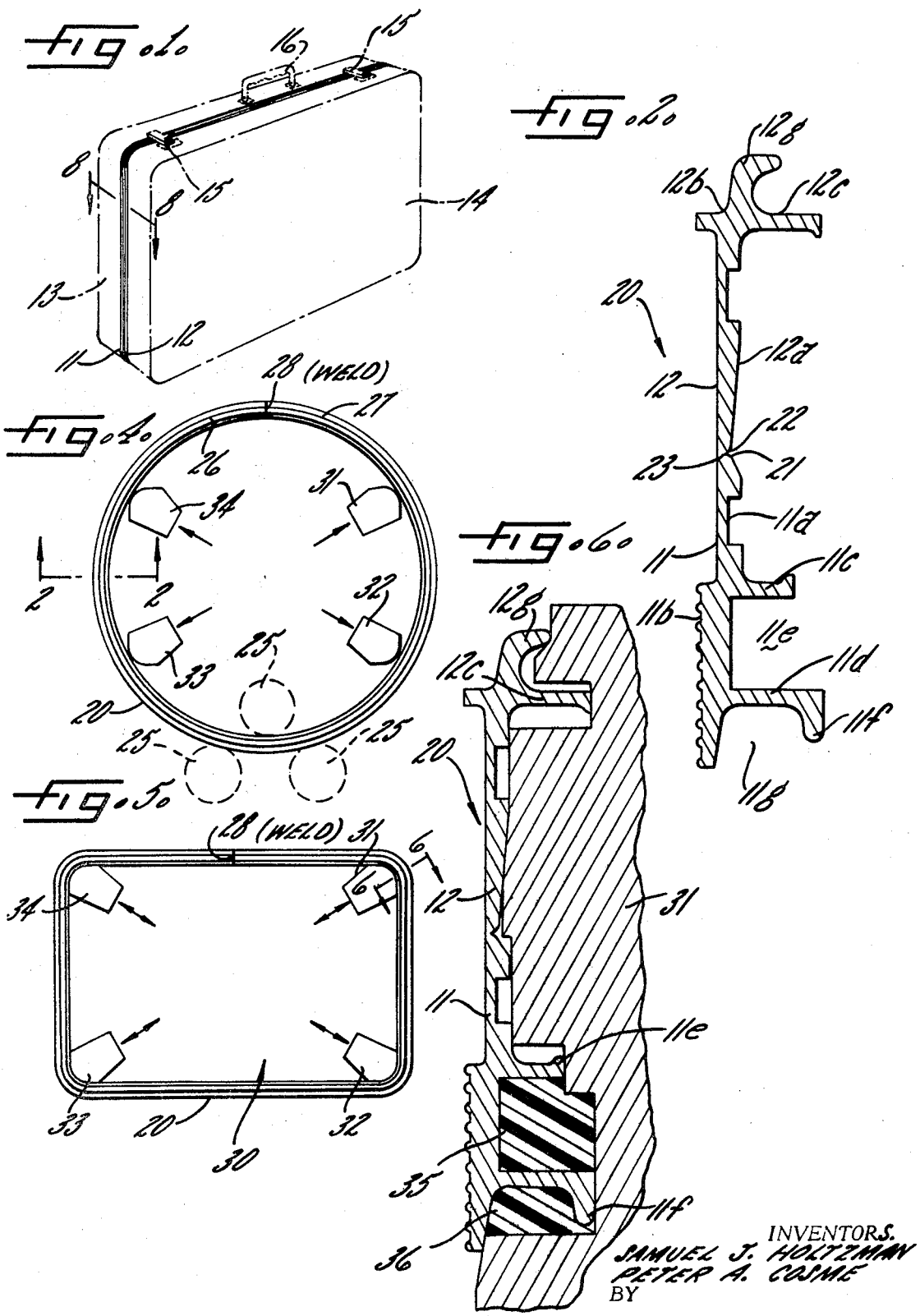

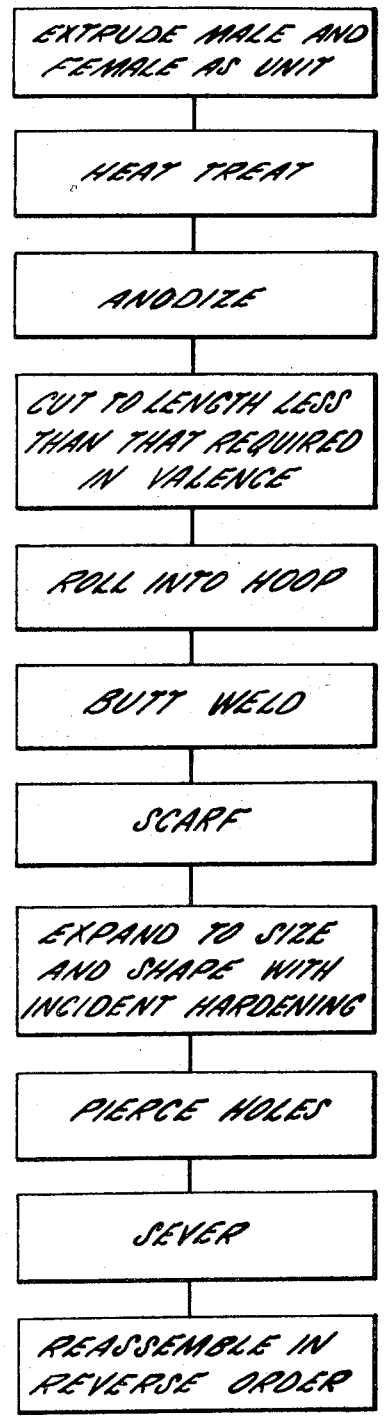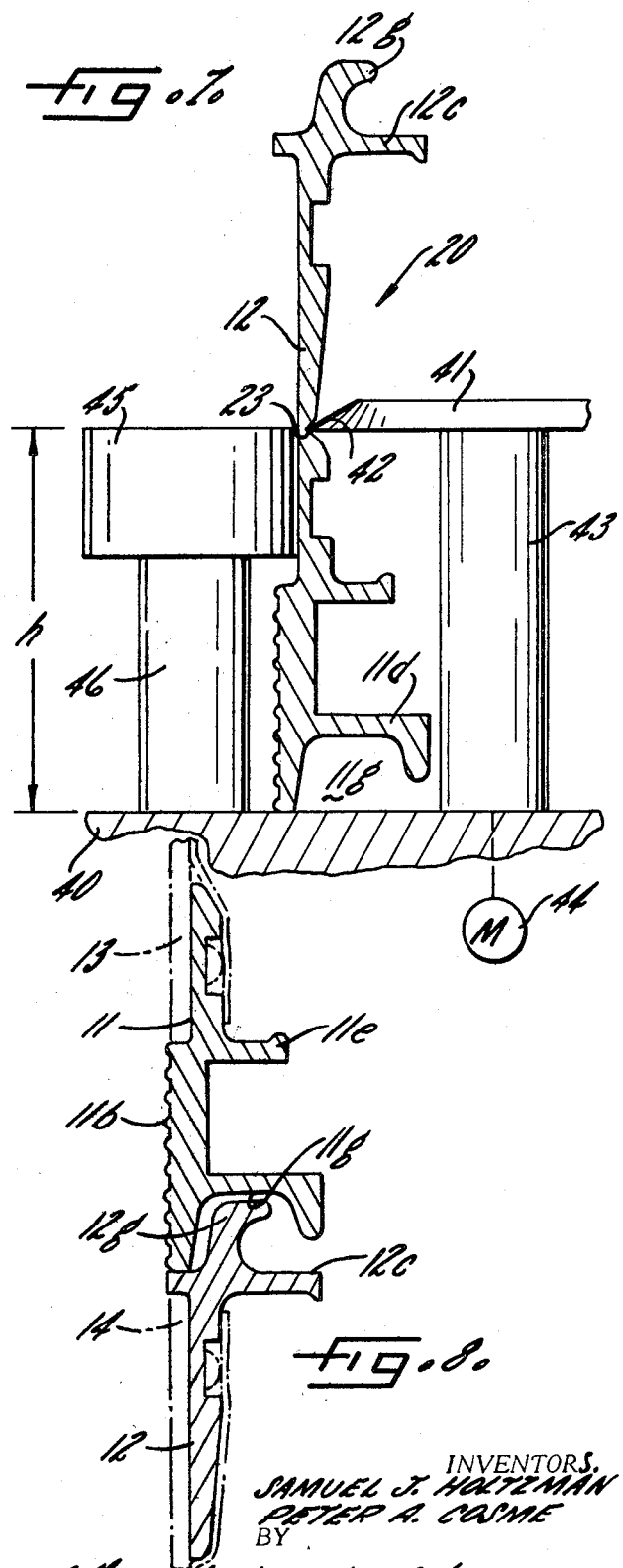

METHOD OF MAKING VALANCES FOR LUGGAGE

Most modern-day luggage is in the form of opposed hollow shells of reinforced plastic or the like fitted at the adjoining edges with moldings or valances, usually in the form of aluminum extrusions or rolled shapes, which are hinged together and intended to mate with one another to produce a sound joint and give an aesthetically pleasing appearance when the luggage is closed.

It has been the practice to make the two valances separately by cutting and bending pieces of extruded stock and then joining the ends together by a splice plate in a suitable jig or fixture in an effort to secure exact sizing. In spite of all possible precautions taken during manufacture it is difficult to secure an exact fit. Moreover, it has been the practice to heat treat the valances after they are formed, followed by chemical treatment of the surface and application of lacquer or the like. For these reasons, among others, luggage has tended to be expensive.

Consequently, it is an object of the present invention to provide a procedure for manufacturing paired male and female valances which is more economical than prior procedures, which does not require exercise of care or individual fitting during the process of manufacture making it well suited to high quantity production but which, nonetheless, produces an assured perfect fit.

It is another object to provide a procedure in which the heat treatment, surface finish, and the like are done with a high degree of economy on the blank before a completed valance is produced.

Other objects and advantages of the invention will become apparent upon reading the attached detailed description and upon reference to the drawings in which:

FIG. 1 is a perspective view, partly in phantom, of a piece of luggage employing valances made in accordance with the present invention.

FIG. 2 shows the cross section of the metal extrusion which serves as the starting point for the improved procedure and as viewed along line 2—2 in FIG. 4.

FIG. 3 is a flow diagram showing the steps used in the preferred and complete procedure from the original extrusion to the final assembly, a number of the steps being of an optional nature.

FIG. 4 shows the extrusion cut to length, looped and butt welded together.

FIG. 5 shows the expanding of the loop to desired final size and shape.

FIG. 6 shows the profile of a typical expanding die looking along the line 6—6 in FIG. 5.

FIG. 7 illustrates the step of severing the extrusion into separate male and female pieces.

FIG. 8 shows the pieces reassembled in mating relation and looking along the line 8—8 in FIG. 1.

While the invention has been described in connection with a preferred embodiment, it will be understood that we do not intend to be limited to the particular embodiment but intend, on the contrary, to cover the various alternative and equivalent constructions which may be included within the spirit and scope of the appended claims.

Turning now to the drawings there is shown in FIG. 1 a piece of luggage having mating valances 11, 12 respectively secured at the edges of shells 13, 14 which may, for example, be of thin fiber-reinforced plastic. The valances are secured together by the usual hinges (not shown) and by suitable locking hardware 15. Then, too, there is a suitable handle 16. It will be understood that the hardware and handle are shown for the sake of completeness only and do not form a part of the present invention.

In accordance with the invention the mating valances are formed as a single composite extrusion consisting of paired male and female cross sections each having a web portion and a mating portion, the web portions being joined integrally, edge-to-edge along a parting line. The original extrusion is acted upon as a unit in the subsequent steps of applying a surface finish, cutting to length, welding in a loop and then expanding, with accompanying bending, to desired size and shape to insure a perfect fit, with final severing and reversing of the order of the pieces into mating relation. Thus, referring to FIG. 2 which shows the original extrusion 20, it will be seen that the extrusion consists of two portions, a female valance cross section 11 and a male valaNce cross section 12 having respective web portions 11a, 12a which lie in a common plane, the web portion being that which underlies and serves to reinforce the edges of the plastic shells.

Turning more specifically to the portion 11 of the extrusion, it has a body which includes a face 11b which is the portion of the valance which is primarily visible in the completed product and which, in the present instance, has a longitudinal striated design. To rigidify the body it includes a pair of integral ribs 11c, 11d which together define a channel 11e. The rib 11d has a lip 11f which defines one side of an edgewise facing channel 11g.

The male cross section 12 has, adjacent to the web 12a, a less massive body 12b reinforced by a rib 12c. Extending edgewise from the body is a projection 12g. Thus it will be seen that the mating elements 11g, 12g extend, in the initial extrusion, edgewise in opposite directions.

For the purpose of distinguishing the two cross sections from one another and provide a parting line for eventual severence, the two portions have chamfered or rounded surfaces 21, 22 defining a longitudinal groove 23 which has a sharp "V" bottom.

While the present invention is not limited to any particular metal or alloy, it will be understood that it is primarily intended for use in connection with soft aluminum alloy of a type which is capable of work-hardening when it is subjected to stretching.

After continuous extrusion into convenient lengths for subsequent handling, the extrusion is subjected to any desired type of heat treatment. The particular heat treating procedure which may be employed does not form a part of the present invention. After the heat treatment, the surface is cleaned and then anodized by the well known procedure of flowing current through the piece while it is immersed in electrolyte and with the piece having anodic, or positive, potential. The anodizing results in a thin wear-resistant layer of aluminum oxide which may, if desired, be permanently dyed with a gold finish or in any other desired color.

Either with or without such surface treatment, the original extrusion is cut to a length which is effectively less than that required in the final valance. The term "effective" refers to the length following a subsequent welding step incident to which a certain amount of length is lost. As will appear, a shorter than final length is desired in order to provide for subsequent intentional expansion to final dimension.

As the next step in the procedure, the cut length of extrusion 20 is bent into a loop so that the ends of the extrusion are opposite to one another. Thus, as shown in FIG. 4, the extrusion 20 may be acted upon by a set of rollers 25 to provide a loop of constant curvature to bring the ends 26, 27 face to face. After looping, the ends are welded together as indicated at 28 employing conventional butt welding techniques. Any excess metal at the weld may, at this point, be removed by a scarfing operation during which the metal is scraped or machined away so that the joint becomes practically invisible.

The extrusion 20, with its welded joint, is then placed in an expanding machine generally indicated at 30. The expanding machine does not per se form a part of the present invention and it will suffice to say that it includes dies 31–34 which are movable endwise in the direction of the arrows and which have means for forcible expansion and subsequent retraction. While the extrusion need not be bent into a circular loop, as shown in FIG. 4, in the practice of the invention a circular loop is preferred since it is largely self centering on the expanding dies and since phase position is largely immaterial.

Each of the dies 31–34 preferably presents a face which conforms to the inner surface of the original extrusion being acted upon. Thus, taking the die 31 by way of example, it will be seen in FIG. 6 that the surface which engages the extrusion is dimensioned and profiled so as to provide surface support for the extrusion during the expanding step. In order to preserve the shape of the extrusion during the expanding and bending step, any channels in the extrusion, in the present instance channels 11e and 11g, are fitted with a plastic filler piece. The filler pieces, indicated at 35, 36 are in the form of strips of flexible yet substantially non-compressible plastic as, for example, polyurethane. The use of filler pieces, and their dimensioning, to prevent deformation or collapse of channel sections of an extrusion incident to bending into shape is known in the art and does not per se form a part of the present invention. It will be apparent, too, that the particular paths followed by the dies during the expanding stroke, that is to say, their initial and final positions, to equalize the stressing about the four sides of the resultant rectangular shape, as well as the total amount of stretch, is a matter well within the skill of the expander art. It will suffice to say that the extrusion 20 is stretched to the degree sufficient to work-harden the metal which, in a practical case, may involve a stretch on the order of 1 to 3 percent. Since both the male and female valance cross sections are equally engaged, during the stretching operation, by the same die while integral with one another, it will be apparent that both will be stretched to precisely the same degree and to precisely the same final dimension so that perfect interfitting of the resulting valances will be assured. It may be noted that the stretching which occurs during the step shown in FIG. 5 does not noticeably affect the surface finish.

After the original, composite extrusion is stretched to its final shape and dimension it may, while still being handled as a single piece, be pierced with suitable fastening holes or otherwise locally machined or deformed, for example, by the striking out of lugs required for fastening purposes.

The resulting product is then subjected to the penultimate step of severing into two pieces. Such severing may be conveniently done on a parting table indicated at 40 in FIG. 7 having a rotating cutter 41 presenting a sharpened edge 42 and which is mounted upon a shaft 43 driven by a geared motor or other suitable power source 44. Arranged opposite the cutting disc 41 is a back-up roller 45 which is rotatably mounted upon a suitable support 46. The cutter 41 and roller 45 are positioned to come together at a height h which corresponds to the location of the parting line 23. Either the shaft 43 which drives the cutter or the support 46 which supports the roller may have provision for lateral movement to produce localized shearing action which causes parting at the root of the groove without any bodily deformation of either of the two pieces.

After severing, the pieces 11, 12 are reversed in their order so that the longitudinal extension or ridge 12g of the part 12 occupies the groove 11g of the part 11 with the severed webs extending in opposite directions. The pieces are thereafter kept together as a pair until installed in the plastic shells 13, 14.

It will be apparent that using the procedure outlined above the paired male and female portions must necessarily be of the same shape and dimension, and this is true regardless of the tolerances which are adhered to in the individual manufacturing steps. For example, it does not make any difference whether the valances of successive pieces of luggage are of identically the same size and shape since small variations from one piece of luggage to the next will not be noticeable. The important consideration is that the procedures prevent those variations which often occur between mated pieces and which are both noticeable and objectionable.

While the invention has particular utility in connection with luggage, it will be understood that it is not limited to travelling bags as such but is equally applicable to analagous two-part enclosures, and consequently the term "luggage" as used herein shall be understood to include not only travelling bags but brief cases, sample cases, storage cases, or indeed any two-part enclosure having individual frames or valances which must be closely interfitted.

The term "continuous length" used in connection with the extrusion simply refers to the fact that the extrusion is produced in a length which is substantially greater than that which will normally be required for a valance. The term "rolling" into a hoop refers to the bending of a length of extrusion to bring the opposed ends together, whether or not done by rollers in a circular locus. The term "butt welding" is intended to include any means for fastening end to end with a continuous metallic connection. The term "chamfered" as employed in connection with the parting line refers to any edge treatment leading to a sharp "V" groove which, after parting, produces a beveled or rounded appearance, avoiding any raw edge.

What we claim is:

1. In the manufacture of mating metal valances for luggage or the like, the steps of extruding paired male and female valance cross sections edge to edge as a continuous integral extrusion and in continuous length, cutting the extrusion to an effective length which is less than that required in the valances, rolling the extrusion into a loop, butt welding the ends to close the loop, expanding the closed loop by means of expanding dies arranged in the corner positions until the extrusion is in the final desired size and shape, severing the extrusion along a parting line to produce separate male and female pieces, and then reassembling the pieces in reverse order.

2. The method claimed in claim 1 in which the severing is accomplished by progressive localized shearing free of any deformation of the mating parts.

3. In the manufacture of mating aluminum valances for luggage or the like, the steps of extruding paired male and female valance cross sections having respective web portions and with the web portions integral edge to edge in a single extrusion of continuous length, anodizing the extrusion, cutting the extrusion to an effective length which is slightly less than that required in the valances, rolling the extrusion into a loop, butt welding the ends, scarfing the weld, expanding to desired size and shape by dies in the corner positions and with sufficient elongation to produce work-hardening of the metal, piercing of necessary holes, severing along a longitudinal parting line to separate the extrusion into male and female pieces, and then reassembling the pieces in reverse order to form a mating valance assembly.

* * * * *